Dec. 31, 1968  H. C. MITCHELL  3,418,868
CRANK HANDLE ASSEMBLY
Filed April 18, 1967  Sheet 1 of 2
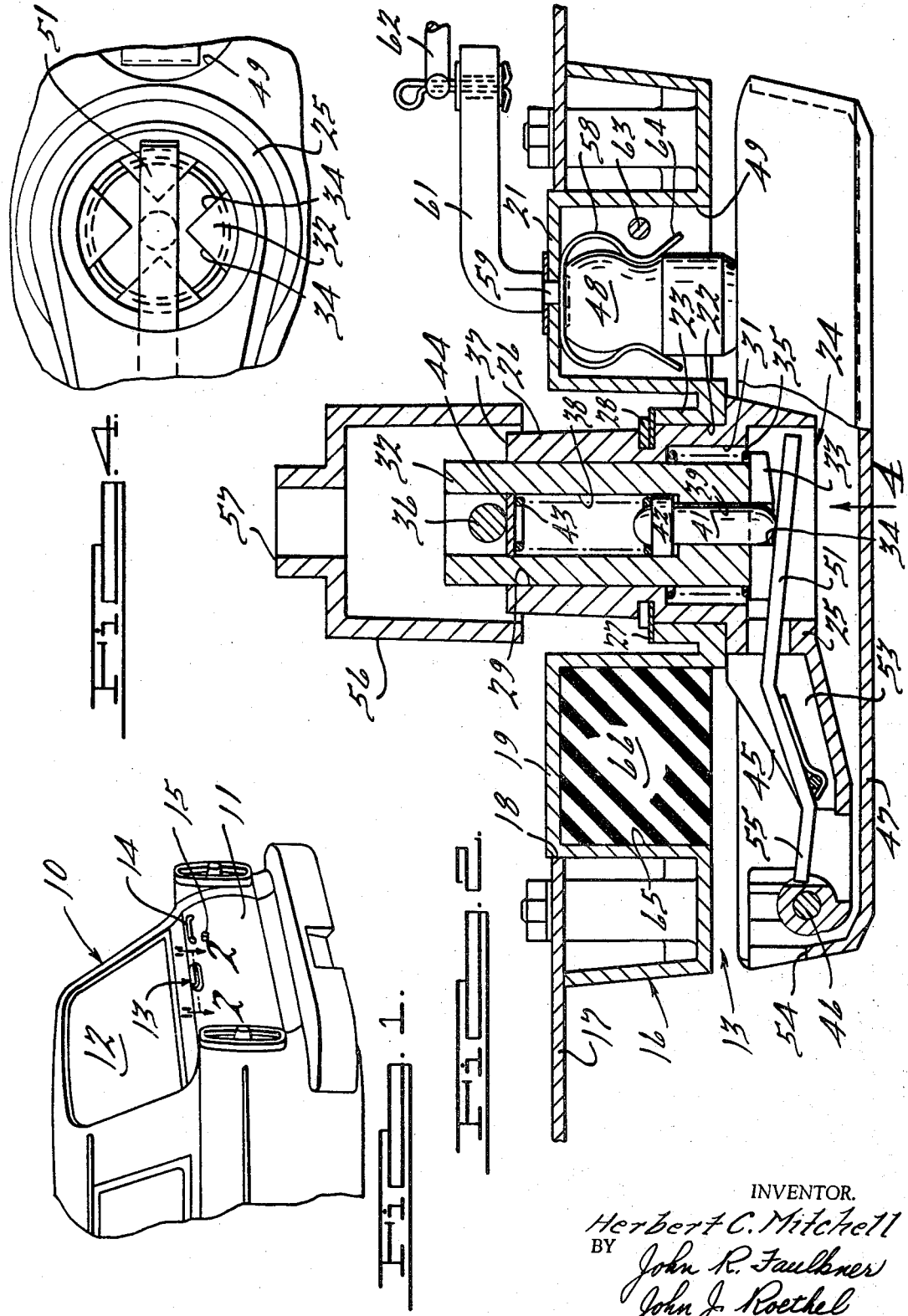
INVENTOR.
Herbert C. Mitchell
BY John R. Faulkner
John J. Roethel
ATTORNEYS.

Dec. 31, 1968      H. C. MITCHELL      3,418,868
CRANK HANDLE ASSEMBLY
Filed April 18, 1967      Sheet 2 of 2
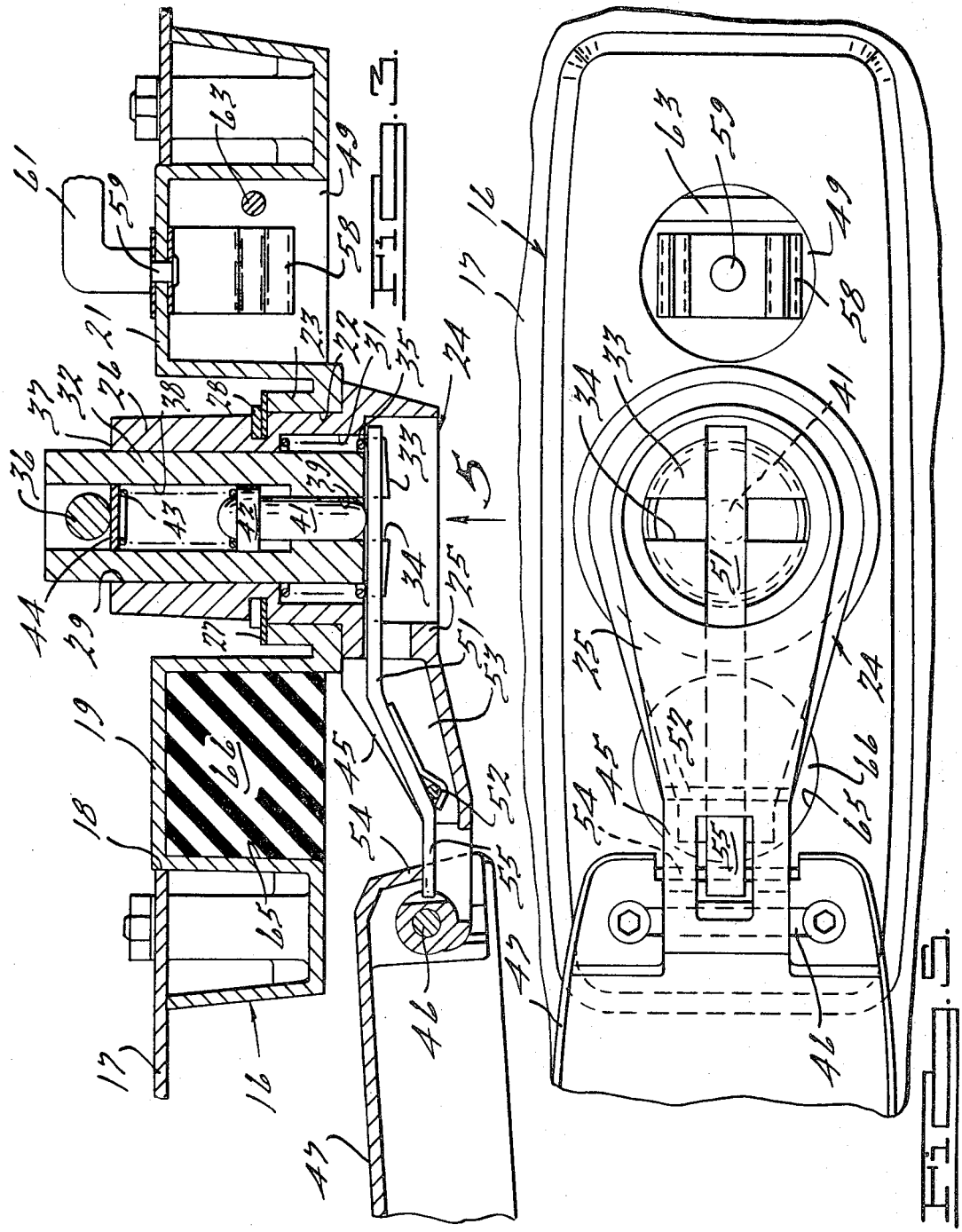
INVENTOR.
Herbert C. Mitchell
BY John R. Faulkner
John J. Roethel
ATTORNEYS.

United States Patent Office 3,418,868
Patented Dec. 31, 1968

3,418,868
CRANK HANDLE ASSEMBLY
Herbert C. Mitchell, St. Clair Shores, Mich., assignor to Ford Motor Company, Dearborn, Mich., a corporation of Delaware
Filed Apr. 18, 1967, Ser. No. 631,814
7 Claims. (Cl. 74—547)

ABSTRACT OF THE DISCLOSURE

A crank handle assembly having a rotatable crank means and a shaft means journalled in the crank means, the shaft means being connected to the mechanism to be driven by the crank handle assembly. A coupling means interposed between the crank means and shaft means determines whether or not rotation of the crank means will be transmitted to the shaft means. The position of an operating handle pivoted on the crank means determines whether or not the coupling means will couple the crank means to the shaft means.

Background of the invention

There are certain applications of crank handle assemblies in which the device must have specific characteristics. For example, the crank handle assembly must always be returnable to a neutral inoperative position without causing further movement of the operated mechanism. It also must have sufficient cranking leverage to operate the mechanism to which it is coupled. It preferably should be collapsible to a reasonable aesthetic size. And, it may be desirable for provision to be made so that the crank handle assembly can be locked against operation.

The foregoing characteristics are particularly applicable to crank handle assemblies coupled to window regulator mechanisms for raising and lowering station wagon tailgate windows. Since such crank handle assemblies are usually located on an exterior panel of the vehicle body, there is usually a single position to which the visible portions of the mechanism must be returned after operation of the window raising and lowering mechanism so that the ornamental features of the handle assembly will not be disturbed. Because a tailgate window is a rather heavy piece of glass, it is necessary that the crank handle assembly must have sufficient cranking leverage to operate the mechanism for raising and lowering the window. For aesthetic reasons, the crank handle assembly should be collapsible to a reasonable size after having been extended to provide the necessary leverage. In order to avoid unauthorized entry into the vehicle, provision is preferably made to provide a locking mechanism associated with the crank handle assembly to prevent operation and thereby lowering of the window.

Brief summary of the invention

In accordance with the present invention, there is provided a crank handle assembly for a closure member operating mechanism mounted on a vehicle body. The crank handle assembly comprises a base member adapted to be mounted on the surface of the vehicle body, the base member having a flanged aperture therethrough. A crank means is mounted on the base member, the crank means having at one end a laterally extending cylindrical extension rotatably journalled in the flanged aperture on the base member. The crank means has at its other end an operating handle swingably mounted for swinging movement between a position in which it overlies the crank means to a position in which it forms a longitudinal extension of the crank means. Rotatably journalled in the cylindrical extension is a shaft means having one end adapted to be conected to the closure member operating mechanism. Interposed between the crank means and the shaft means is a coupling means for drivingly coupling the crank means to the shaft means for rotation by the latter. The coupling of the crank means to the shaft means occurs in response to movement of the operating handle to the position in which it forms a longitudinal extension of the crank means.

Brief description of the drawing

Other objects, advantages and features of construction of the present invention will be made more apparent as this description proceeds, particularly when considered in connection with the accompanying drawings, wherein:

FIG. 1 is a fragmentary perspective view of the rear end of a station wagon having a tailgate on which the crank handle assembly embodying the present invention is mounted;

FIG. 2 is a sectional view taken on the line 2—2 of FIG. 1;

FIG. 3 is a sectional view in part similar to FIG. 2 illustrating the crank handle assembly with certain of its parts moved to an operating position;

FIG. 4 is a fragmentary view looking in the direction of the arrow 4 in FIG. 2; and FIG. 5 is an elevational view looking in the direction of the arrow 5 in FIG. 3.

Description of the preferred embodiment

Referring now to the drawings, FIG. 1 shows a portion of the rear end of a station wagon vehicle body 10. The body 10 has a door or tailgate 11 mounted at the rear. This door or tailgate 11 is provided with a window 12 that may be raised and lowered through an operation of a manually operable window regulator mechanism (not shown). The window regulator mechanism is adapted to be manually actuated by a crank handle assembly 13 embodying the present invention. Also indicated in FIG. 1 is an outer handle and latch mechanism actuator 14 and a key cylinder mechanism 15, both of which are conventional and found on many station wagon tailgates. Only the key cylinder mechanism has any direct connection to the crank handle assembly 13, as will be more fully described.

Referring now to FIGS. 2, 3 and 5, the crank handle assembly 13 comprises a substantially rectangular base member 16 adapted to be mounted on the exterior surface of a door or tailgate panel 17. The panel is apertured at 18 to receive inwardly projecting parts of the base member such as the longitudinally spaced cylindrical bosses 19 and 21 and certain operative parts of the crank handle assembly. Between the two bosses 19 and 21 and substantially in the center of the base member 16, the latter has an aperture 22 circumscribed by an inwardly extending flange 23.

Supported on the base member 16 is a crank means, generally designed 24, comprising a crank member 25 having at one end a laterally extending cylindrical extension 26 which is rotatably journalled in the flanged aperture 22. Withdrawal of the cylindrical extension 26 is prevented by a Belleville spring washer 27 and a snap ring 28. As best seen in FIG. 2, the cylindrical extension 26 projects into the body panel opening 18 beyond the plane of the body panel 17. The cylindrical extension 26 has an axial bore 29 therethrough which at one end has a counterbore 31.

A shaft 32 is rotatably journalled in the bore 29 of the cylindrical extension 26. The shaft 32 has enlarged head 33. A pair of grooves 34 are cut into the head surface at right angles to each other. A compression spring 35 seated in the counterbore 31 of the cylindrical extension 26 urges the shaft 32 in a direction away from the body panel 17. This movement is limited, however, by a pin 36 extending radially of the shaft 32 and adapted to abut the end face 37 of the cylindrical extension 26.

The shaft 32 also has an axially extending stepped bore therethrough, the stepped bore having a first portion 38 of slightly larger diameter than the second portion 39. The second portion 39 guides an ejector pin 41 from movement axially of the shaft 32. The pin 39 has an enlarged portion 42 near its inner end which is slidable in the bore portion 38 and forms a bearing surface against which one end of a compression spring 43 abuts. The other end of the spring bears against a washer 44 which, in turn, abuts the pin 36. The spring 43 urges the pin 41 toward the head end 33 of the shaft 32 so that the end of the pin will project into the intersection of the grooves 34, for a purpose to become apparent.

The crank member 25 is approximately half as long as the base member 16 and, as seen in FIG. 5, has tapered sides terminating in a narrow end portion 45. This end portion 45 carries a laterally extending pin or shaft 46 on which is journalled an operating handle 47. The operating handle 47 is a substantially hollow or shell-like member having a contour complementary to the base member 16 contour. When in a noncranking position, the handle 47 overlies the crank means 24, see FIG. 2. Thus, none of the operating mechanism is visible and the exterior surface of the operating handle may be inscribed with suitable ornamentation. In operating or cranking position, the operating handle is displaced about 180° from its FIG. 2 position as partially shown in FIG. 3.

Journalled on the inner side of operating handle 47 near its end opposite its pivoted end is a rotatable knob 48 which extends laterally from the inner surface of the operating handle toward the base member 16. As seen in FIG. 2, the knob 48 extends into a recess 49 formed in the boss 21 of the base member 16. When the operating handle is swung to its FIG. 3 position, the knob 48 is exposed and may be grasped to assist in the cranking movement of the crank means 24 and the operating handle 47.

An important feature of the present invention is the provision of a means for coupling the crank member 25 to the shaft 32 so that when the crank member is rotated about the axis of its cylindrical extension 26, the rotary movement of the cylindrical extension 26 will be accompanied by a corresponding rotary movement of the shaft 32. The coupling means comprises an elongated finger element 51 which is adapted to cooperate with the grooves 34 in the enlarged 33 on the shaft 32. The elongated finger 51 has a width complementary to the width of the grooves 34 and is pivotally mounted on a pin 52 projecting laterally through the side walls 53 of the crank member 25. The length of the finger element 51 is such that it substantially overlies the enlarged head 33 on the shaft 32 in the one direction from its pivot axis 52. In the other direction from the pivot axis 52, the finger element projects into the path of a notched out portion of the end wall 54 of the operating handle 47. The end portion of the finger element 51 engageable by the end wall 54 of the operating handle 47 is designated 55. Referring to FIG. 2, there is shown a coupling element 56 which is coupled to the crank means 24 by the pin 36 on the one end and on its other end 57 it is adapted to be suitably connected to the operating shaft of the window regulator mechanism for raising and lowering the window 12. This coupling element 56 may take any form or shape and is not considered a part of the combination comprising the present invention.

Before explaining the operation of the crank handle assembly embodying the present invention, there are a few additional details which should be described. It will be noted in FIG. 2 that the end of the knob 48 is encompassed by a spring clip 58 which is secured to the end 59 of a crank rod 61. The crank rod 61 in turn is adapted to be coupled by a link 62 to the key cylinder mechanism 15 mentioned with reference to FIG. 1. Projecting across the recess 49 is a pin 63 which prevents the leg 64 of the clip 58 from expanding sufficiently to permit the withdrawal of the knob 48 when in the FIG. 2 position. Suitable operation of the crank 61 through the link 62 to the key cylinder mechanism 15 will cause the clip 58 to be rotated 90° to the position shown in FIGS. 3 or 5. In this latter position, there is nothing to prevent the clip legs from expanding and the knob 48 from being withdrawn. Thus, when the parts are in the FIG. 2 position, the handle is locked in such a manner that the window cannot be raised or lowered.

The base member boss 19 also is provided with a recess 65. This recess is filled with a rubber cushion or bumper against which the end of the knob 48 will harmlessly abut in the event it is attempted to move the operating handle 47 from its inoperative position when the operating handle is 180° out of phase with the base member.

*Operation*

Referring first to FIG. 2, the parts of the crank handle assembly 13 are shown in their inoperative position. That is, the operating handle 47 is folded over the crank means 24 concealing the latter within the base member 16. The operating handle 47 cannot be moved to a position in which it will form a longitudinal extension of the crank member 25 because the knob 48 is held against withdrawal from the clip 58 in the base member 16 by the pin 63. Therefore, to release the operating handle 47 for movement to an operative position, it is first necessary to rotate the clip 58 90° to the FIG. 3 or 5 position. The operating handle 47 may then be swung from its FIG. 2 position to its FIG. 3 position. It will also be noted that the spring loaded pin 41 is holding the finger element 51 out of engagement with either of the pair of grooves 34 extending across the top of the enlarged head 33 of the shaft 32. If the finger element 51 is in proper alignment with either of the pair of grooves 34, as the operating handle is swung to its fully extended position, as shown in FIG. 3, the end wall 54 will abut the end 55 of the finger element 51 and drive the latter down into the aligned groove 34 against the resistance of the spring 43 urging the ejector pin 41 outwardly. This operative relationship is shown in FIG. 3.

With the finger element 51 contained within a groove 34, the crank member 25 is coupled to the shaft 32 and rotation of the crank member by swinging force exerted on the operating handle 47 will be transmitted to the shaft 32. The direction or rotoation of the shaft 32 will depend upon the direction in which the operating handle and crank member are swung.

If it should happen that the finger element 51 is not in alignment with either of the pair of grooves 34, as shown in FIG. 4, any pressure exerted on the finger element by engagement of its end 55 by the end wall 54 of the operating handle 47 will merely bodily axially shift the shaft 26 inwardly against the resistance of the spring 35. It will be readily apparent that only a few degrees of rotation of the crank member 25 will be required before the finger element 51 is in alignment with one of the pair of grooves 34 and the latter will then drop down into the groove to couple the crank member 25 to the shaft 32 causing the latter to be rotated.

After the cranking operation is completed, the operating handle 47 will be folded over the crank member 25 by swinging it in a counterclockwise direction about the pivot shaft 46. As soon as the end wall 54 of the operating handle 47 releases its pressure on the end 55 of the finger element 51, the ejector pin 41 under the urging of the spring 43 will drive the finger element out of engagement with the head end of the shaft 32. The shaft 32 will then remain stationary as the crank member 25 freewheels relative to this shaft member. The operating handle 47 then can be placed in proper longitudinal alignment with the base member and the knob 48 pressed into the clip 58 to retain it in this position.

The foregoing description presents the presently preferred embodiment of this invention. Modifications and alterations may occur to those skilled in the art that will come within the scope and spirit of the following claims.

I claim:

1. A crank handle assembly for a closure member operating mechanism mounted on a vehicle body, comprising:

a base member adapted to be mounted on a surface of said vehicle body and having a flanged aperture therethrough, a crank means having at one end a laterally extending cylindrical extension rotatably journalled in said flanged aperture, an operating handle swingably mounted on the other end of said crank means for swinging movement between a position in which it forms a longitudinal extension of the crank means, shaft means rotatably journalled in said cylindrical extension having one end adapted to be connected to a closure member operating mechanism, and coupling means interposed between said crank means and said shaft means to drivingly couple the latter to said crank means for rotation, said coupling means disengaging the crank means from the shaft means when said operating handle overlies the crank means and being responsive to movement of said operating handle to the position in which it forms a longitudinal extension of said crank means to couple the crank means to the shaft means.

2. A crank handle assembly according to claim 1, in which:

the coupling means includes an elongated finger element extending longitudinally of the crank means and pivoted to the latter on the operating handle end thereof, and the shaft means on its end face within the crank means cylindrical extension having grooves adapted to receive the finger element in predetermined positions of alignment, said finger element when seated in said grooves causing the shaft means to rotate in unison with the crank means upon the operating handle being swung about the axis of rotation of the shaft means.

3. A crank handle assembly according to claim 2, in which:

the finger element has a part thereof extending from the pivot axis of the finger element into the path of a part said operating member, said parts abutting upon said operating handle being swung to the position in which it forms a longitudinal extension of said crank means whereby said finger element is swung about its pivot axis in the direction of engagement with the end face of said shaft means.

4. A crank handle assembly according to claim 3, in which:

an ejector pin is housed within the shaft means, and a spring means housed within said shaft means urges said ejector pin in a direction so that one end thereof projects into the finger receiving groove area, said spring loaded ejector pin being operative to disengage the finger element from the shaft means grooves upon said operating handle being swung toward the position in which it overlies the crank means.

5. In a crank handle assembly according to claim 4, in which:

a spring means is interposed between said cylindrical extension of the crank means and said shaft means to yieldably position the latter in finger element engaging position, said spring means permitting said shaft means to move axially when pressure is exerted on the end face thereof by said finger element when the latter is not in alignment with the grooves in the end face of the shaft means.

6. A crank handle assembly according to claim 5, in which:

the operating handle has a laterally extending rotatable knob portion, said base member having a recess adapted to receive the rotatable knob portion when said operating handle overlies the crank means, and locking means housed within said base member recess engageable with said knob to prevent withdrawal of the latter from the recess and thereby to prevent the operating handle being swung from the position in which the crank handle means to the position in which it forms a longitudinal extension of the crank means.

7. A crank handle assembly according to claim 1, in which:

the operating handle has a laterally extending rotatable knob portion, said base member having a recess adapted to receive the rotatable knob portion when said operating handle overlies the crank means, and locking means housed within said base member recess engageable with said knob to prevent withdrawal of the latter from the recess and thereby to prevent the operating handle being swung from the position in which it overlies the crank means to the position in which it forms a longitudinal extension of the crank means.

References Cited

UNITED STATES PATENTS

| 1,659,506 | 2/1928 | Wheeler | 74—547 |
| 2,165,060 | 7/1939 | Krug | 74—547 |
| 1,557,073 | 10/1925 | McWhirter | 74—547 |

FOREIGN PATENTS

| 156,656 | 5/1954 | Australia. |
| 405,019 | 7/1966 | Switzerland. |

FRED C. MATTERN, JR., *Primary Examiner.*

WESLEY S. RATLIFF, *Assistant Examiner.*

U.S. Cl. X.R.

192—095, 096